(12) United States Patent
Fischer

(10) Patent No.: US 8,360,177 B2
(45) Date of Patent: Jan. 29, 2013

(54) DRIVE UNIT FOR A VEHICLE FOR USE AS A ROBOT IN PIPE SYSTEMS, CAVITIES OR THE LIKE AND A VEHICLE HAVING SAME

(75) Inventor: Wolfgang Fischer, Zürich (CH)

(73) Assignee: Alstom Technology Ltd, Baden (CH)

( * ) Notice: Subject to any disclaimer, the term of this patent is extended or adjusted under 35 U.S.C. 154(b) by 33 days.

(21) Appl. No.: 13/086,270

(22) Filed: Apr. 13, 2011

(65) Prior Publication Data

US 2011/0253470 A1 Oct. 20, 2011

(30) Foreign Application Priority Data

Apr. 14, 2010 (CH) ........................................ 0539/10

(51) Int. Cl.
*B62D 57/024* (2006.01)
(52) U.S. Cl. ............................ 180/7.1; 180/8.1; 180/9.1
(58) Field of Classification Search .................. 180/7.1, 180/8.1, 8.3, 8.4, 8.5, 9.3, 9.32, 9.34, 901; 901/1; 301/6.5, 6.1
See application file for complete search history.

(56) References Cited

U.S. PATENT DOCUMENTS

| | | | | |
|---|---|---|---|---|
| 3,719,395 | A * | 3/1973 | Mulasmajic | 301/5.1 |
| 4,616,326 | A | 10/1986 | Meier et al. | |
| 4,851,748 | A | 7/1989 | Daggett et al. | |
| 4,868,472 | A | 9/1989 | Daggett et al. | |
| 4,908,556 | A | 3/1990 | Daggett et al. | |
| 4,962,338 | A | 10/1990 | Daggett et al. | |
| 5,284,096 | A * | 2/1994 | Pelrine et al. | 104/138.2 |
| 5,392,715 | A * | 2/1995 | Pelrine | 104/138.2 |
| 5,685,383 | A | 11/1997 | Ferrante | |
| 6,104,970 | A | 8/2000 | Schmidt, Jr. et al. | |
| 7,233,221 | B2 * | 6/2007 | Reboredo Losada et al. | 335/302 |
| 7,624,827 | B2 * | 12/2009 | Moser et al. | 180/9.32 |
| 7,958,955 | B2 * | 6/2011 | Moser et al. | 180/8.3 |
| 8,214,081 | B2 * | 7/2012 | Choi et al. | 700/250 |
| 2008/0148876 | A1 | 6/2008 | Hock et al. | |
| 2010/0011522 | A1* | 1/2010 | Kim et al. | 15/3 |

FOREIGN PATENT DOCUMENTS

| | | |
|---|---|---|
| DE | 3244307 A1 | 5/1984 |
| EP | 0526901 A1 | 2/1993 |
| JP | 7246931 A | 9/1995 |
| WO | 2006096122 A1 | 9/2006 |

* cited by examiner

*Primary Examiner* — Tashiana Adams
(74) *Attorney, Agent, or Firm* — Volpe and Koenig, P.C.

(57) ABSTRACT

A drive unit for a vehicle is provided for use as a robot in pipe systems, cavities or the like. The drive unit includes at least one ring-like outer wheel and at least one driven magnetic wheel. The outer and the magnetic wheels have axes parallel to each other and are arranged eccentrically to one another, and engage one another such that when rotating relative to the outer wheel, the magnetic wheel delineates with its wheel axis a concentric circle lying within the outer wheel. In such a drive unit, stronger magnetic adhesion is enabled by the outer and magnetic wheels being arranged one behind the other in an axial direction. The engagement between the outer and magnetic wheels is effected by a circular, concentric disk connected securely against rotation to the magnetic wheel and rolls with its outer peripheral surface on the inner peripheral surface of the outer wheel.

18 Claims, 11 Drawing Sheets

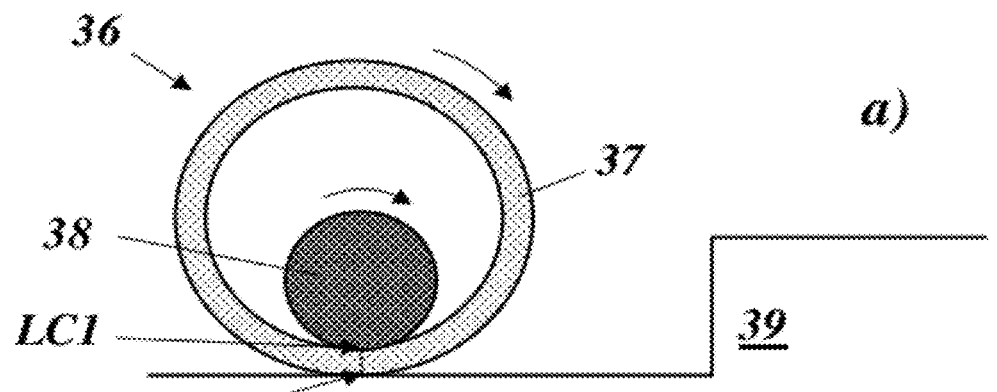
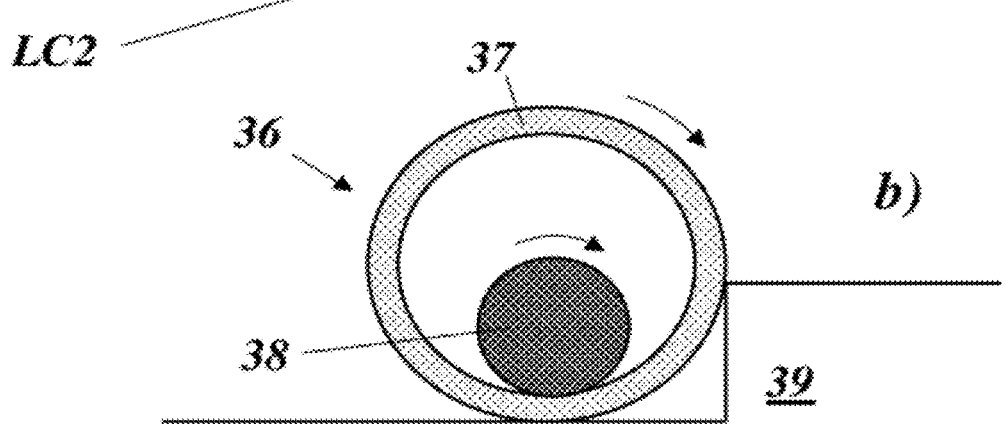
Fig.1
(Prior Art)
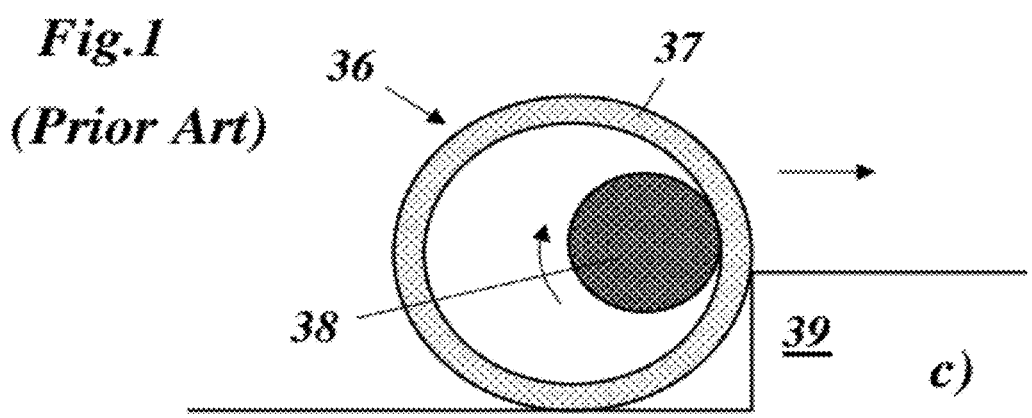

$$d1 - d2/sqrt(2) > D1 - D2/sqrt(2)$$

$d1-d2 \leq D1-D2$

DRIVE UNIT FOR A VEHICLE FOR USE AS A ROBOT IN PIPE SYSTEMS, CAVITIES OR THE LIKE AND A VEHICLE HAVING SAME

FIELD OF INVENTION

The present invention relates to the field of robot technology. Specifically, it relates to a drive unit and a vehicle having such a drive unit.

BACKGROUND

In the past, a multiplicity of proposals have been made as to how it is possible in the case of vehicles that are used as robots for inspection or repair in pipe systems or other cavities to employ simple passive mechanisms so as to ensure that the vehicles can automatically negotiate corners or more generally concavely constructed obstacles. One of these proposals, which can be designated as wheel inside the wheel, is known from the publication JP7246931A. The principle of this known solution can be explained with the aid of FIG. 1: the known drive unit 36 comprises as essential elements a ring-like outer wheel 37 on whose inner peripheral surface a magnetic wheel 38 of very much smaller outside diameter can roll along. The rolling operation is configured in this case by a toothing (not illustrated) such that it proceeds without slippage. The magnetic wheel 38 is driven by a device that is not illustrated in the figure. As the vehicle moves, the outer wheel 37 rolls along on the underlying surface on which the vehicle is moving.

When, as illustrated in FIG. 1, an obstacle in the form of an edge or step 39 is located in the movement path of the vehicle, which is fitted with the drive unit 36, the rolling movement of the outer wheel 37 is stopped—as shown in FIG. 1b. The stationary outer wheel 37 forms in the region of the edge 39 a type of curved ramp on which the driven magnetic wheel 38 can roll upward (FIG. 1c). In this way, the magnetic wheel 38 increasingly leaves the region of magnetic attraction lying ahead of the edge 39 and dives into the region of magnetic attraction lying behind the edge 39. This has the effect that the outer wheel 37 can roll further away over the edge 39. The obstacle is easily negotiated in this way by the wheel inside the wheel mechanics.

However, this known solution has various disadvantages: as illustratively seen in FIG. 1a, there exist for the magnetic flux density between the magnetic wheel 38 and the underlying surface two linear contacts LC1 and LC2 that substantially weaken magnetic forces during the normal rolling movement.

In the case of the configuration specified in the publication JP7246931A, a pair of magnetic wheels 38 lying far apart from one another are supplied with magnetic force by a long magnet arranged therebetween. On the one hand, this reduces the magnetic force on the magnetic wheel 38. On the other hand, the rigid coupling of the two magnetic wheels 38 by the magnet arranged therebetween prevents the possibility of being able to steer the vehicle by differences in the rotational speed of the two magnetic wheels 38.

If the magnetic wheels of a pair were to be moved more closely together in order to form a compact drive wheel with a higher magnetic force, the outer wheel would need to be designed to be nonmagnetic in the region between the two magnetic wheels in order to prevent a magnetic short circuit between the two magnetic wheels. However, this is very demanding in terms of production engineering, particularly when the wheels involved must be small.

SUMMARY

The present disclosure is directed to a drive unit for a vehicle used as a robot in pipe systems or cavities. The drive unit includes at least one ring-like outer wheel and at least one driven magnetic wheel. The at least one outer wheel and the at least one magnetic wheel have axes that are parallel to each other and are arranged eccentrically in relation to one another, and engage with one another, in such a way that, when rotating relative to the at least one outer wheel the at least one magnetic wheel delineates with its wheel axis a concentric circle lying within the outer wheel. The outer wheel and the magnetic wheel are arranged one behind the other in an axial direction, and the engagement between the outer wheel and the magnetic wheel is effected by a circular, concentric disk that is connected securely against rotation to the magnetic wheel and rolls with its outer peripheral surface on the inner peripheral surface of the outer wheel.

In another aspect, the disclosure is directed to a vehicle for use as a robot in pipe systems or cavities. The vehicle includes a vehicle body on which at least one drive unit is arranged for locomotion. The drive unit includes at least one ring-like outer wheel and at least one driven magnetic wheel. The at least one outer wheel and the at least one magnetic wheel have axes that are parallel to each other and are arranged eccentrically in relation to one another, and engage with one another, in such a way that, when rotating relative to the at least one outer wheel the at least one magnetic wheel delineates with its wheel axis a concentric circle lying within the outer wheel. The outer wheel and the magnetic wheel are arranged one behind the other in an axial direction, and the engagement between the outer wheel and the magnetic wheel is effected by a circular, concentric disk that is connected securely against rotation to the magnetic wheel and rolls with its outer peripheral surface on the inner peripheral surface of the outer wheel.

BRIEF DESCRIPTION OF THE DRAWINGS

The invention is to be explained in more detail below with the aid of exemplary embodiments in conjunction with the drawing, in which:

FIGS. 1(a) to 1(c) show various phases in the negotiation of a step by a drive unit according to the prior art;

DETAILED DESCRIPTION OF THE PREFERRED EMBODIMENTS

Introduction to the Embodiments

Figure 2:
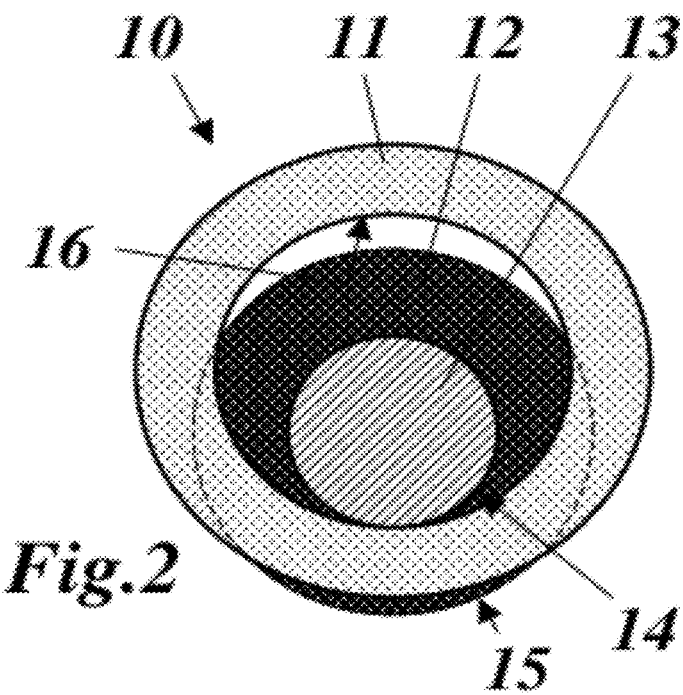
FIG. 2 shows a view in an axial direction of the fundamental design of a drive unit according to an exemplary embodiment of the invention.

It is therefore an object of the invention to provide a magnetically acting drive unit for a vehicle that can be used in the manner of a robot in pipe systems, cavities or the like, which avoids the disadvantages of the known drive unit and, in particular, is of simple design and can be used flexibly, as well as to specify a vehicle having such a drive unit.

The object is achieved by the totality of the features of claims 1 and 12.

It is essential to the inventive drive unit that the outer wheel and the magnetic wheel are arranged one behind another in an axial direction, and that the engagement between the outer wheel and the magnetic wheel is effected by a circular, concentric disk that is connected securely against rotation to the magnetic wheel and rolls with its outer peripheral surface on the inner peripheral surface of the outer wheel. Several advantages emerge from the outer wheel and magnetic wheel pulling away from one another in an axial direction. One particular advantage is that the magnetic wheel is in direct contact with the underlying surface and rolls off on it so that the magnetic attraction is maximal in the region of the magnetic wheel.

In one refinement of the drive unit according to the invention, the engagement between the disk and the outer wheel is effected by positive locking, in particular by a toothing.

In accordance with another refinement, the engagement between the disk and the outer wheel is effected by friction locking. In order to increase the friction between the outer wheel and the disk, it is possible to provide one or both of the participating surfaces with a coating that amplifies the friction.

According to another refinement of the inventive drive unit, the outside diameter of the outer wheel is greater than the outside diameter of the magnetic wheel. The outside diameter of the outer wheel need only be slightly larger in this case.

Another refinement is distinguished in that the difference between the outside diameter and the inside diameter of the outer wheel is less than or equal to the difference between the outside diameter of the magnetic wheel and the outside diameter of the disk. It is hereby ensured that the magnetic wheel is always in contact with the underlying surface during the normal rolling process.

Another refinement is distinguished in that the difference between the outside diameter and the inside diameter of the outer wheel divided by the square root of 2 is greater than the difference between the outside diameter of the magnetic wheel and the outside diameter of the disk divided by the square root of 2. It is hereby ensured that there is still sufficient friction locking between the outer wheel and surroundings even when a concave 90° corner is being passed, and so the undesired force between the magnetic wheel and old surface is leveled out.

In another refinement of the drive unit, two parallel, equally sized driven magnetic wheels are provided that are spaced apart from one another in an axial direction and are connected in a rotationally secured fashion to the disk, and arranged between the two magnetic wheels is a magnet that together with the two magnetic wheels forms a part of a magnetic circuit.

Here, the disk can be arranged outside the two magnetic wheels. An axial guide is then preferably provided for the outer wheel surrounding the disk.

However, it is also conceivable that the magnet acts simultaneously as the disk, and the outer wheel is supported between the two magnetic wheels.

The inventive vehicle comprises a vehicle body on which at least one drive unit is arranged for locomotion, the drive unit being a drive unit according to the invention.

In one refinement of the inventive vehicle, a plurality of drive units are arranged in pairs on opposite sides of the vehicle body.

In particular, in each case a pair of drive units can be provided on the vehicle body at the front and rear in the travel direction.

The vehicle is particularly maneuverable when, in accordance with another refinement, all the drive units are driven independently of one another.

Furthermore, the vehicle has a high degree of mobility when the vehicle body is subdivided in the travel direction into two subunits interconnected in an articulated fashion, and when each subunit is assigned a pair of drive units.

In addition, there can be provided pivoting arms that project forward and rearward in the travel direction. The arms are pivotable by a drive and can be used to intentionally support the vehicle on the wall as it drives round a convex edge. Irrespective of the type of drive units used, such pivoting arms can also be used advantageously with other robot vehicles.

However, it is also possible for rear wheels and/or auxiliary wheels to be provided on the vehicle body in addition to drive units arranged at the front in the travel direction.

DETAILED DESCRIPTION

Figure 3:
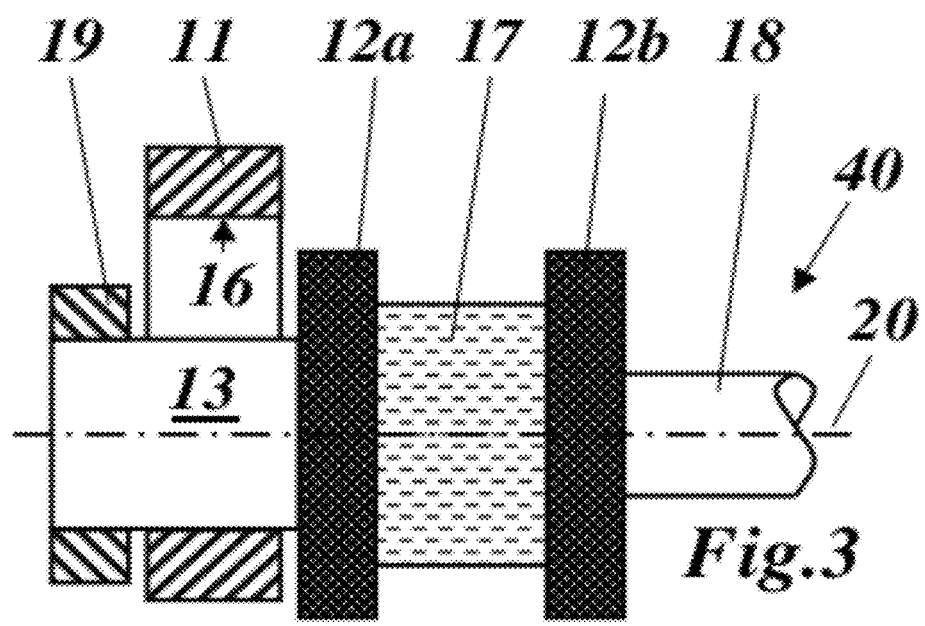
FIG. 3 shows a view transverse to the axial direction of the design of a drive unit according to another exemplary embodiment of the invention.
Figure 8:
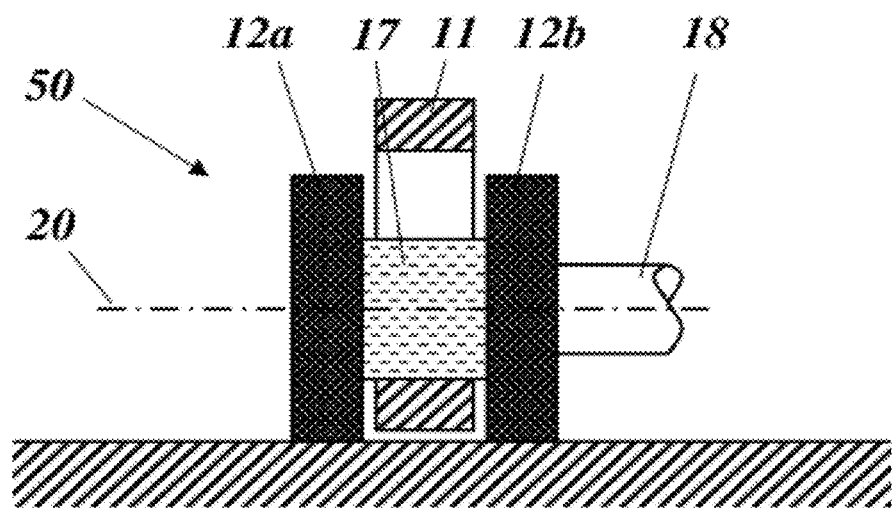
FIG. 8 shows in an illustration comparable to FIG. 3 another exemplary embodiment of an inventive drive unit.

FIG. 2 shows a view in an axial direction of the fundamental design of a drive unit according to an exemplary embodiment of the invention. FIG. 3 shows a view transverse to the axial direction of the design of a drive unit according to another exemplary embodiment of the invention. FIG. 8 shows in an illustration comparable to FIG. 3 another exemplary embodiment of an inventive drive unit.

The drive unit 10 of FIG. 2 comprises a ring-like outer wheel 11 on whose inner peripheral surface 16 a circular disk 13 rolls along. Connected securely against rotation to the disk 13 is a magnetic wheel 12 that is arranged next to the outer wheel 11 in an axial direction and whose outside diameter (D1 in FIG. 5) is substantially larger than the outside diameter (D2 in FIG. 5) of the disk 13. The difference between the two outside diameters is equal to or somewhat greater than the difference between the inside diameter (d2 in FIG. 5) and the outside diameter (d1 in FIG. 5) of the outer wheel 11. The difference between the two differences is illustrated with exaggeration in FIG. 2 for the purpose of explanation.

In order for the disk 13 to be able to roll with its peripheral surface 14 on the inner peripheral surface 16 of the outer wheel 11 as far as possible without slippage, either the disk 13 engages by positive locking with the outer wheel 11 by a toothing, or the peripheral surfaces 14, 16 are designed for secure friction locking. For this purpose, it is possible in particular for surfaces to be provided with a special coating.

As a result of the above described configuration, the magnetic wheel 12 makes direct contact with the underlying surface with the aid of its peripheral surface 15, and so the magnetic adhesive forces between the magnetic wheel 12 and the underlying surface are brought into use optimally. On its peripheral surface 15, the magnetic wheel 12 can be provided with rubber or another material of high friction, in order to increase the coefficient of friction in relation to the underlying surface. In order to enable the drive unit 10 to directly negotiate an obstacle that is in the way that is present in the form of a concave corner (21 in FIG. 4), the outside diameter of the outer wheel 11 (d1 in FIG. 5) should be greater than the outside diameter (D1 in FIG. 5) of the magnetic wheel 12. Ideally, the condition $(d1-d2)/\sqrt{2} > (D1-D2)/\sqrt{2}$ (see FIG. 5(b)) should also be met.

In order for the axial assignment between the outer wheel 11 and the magnetic wheel 12 to be retained, the outer wheel 11 must be guided axially. This guide can be configured differently depending on the design of the drive unit. For the drive unit 40 of FIG. 3, where the magnetic wheel is formed by two magnetic wheel disks 12a and 12b that are spaced apart from one another in an axial direction and between which a magnet 17 orientated in an axial direction is arranged, and the disk 13 and the outer wheel 11 are located outside the magnetic wheel configuration, one possibility for the axial guide consists in the use of an outer wheel 11 made from steel that automatically adheres to the neighboring magnetic wheel disk 12a and is thus axially secured. Another possibility, which is shown in FIG. 3, consists in providing a separate axial guide 19 that limits the axial movement of the outer wheel 11.

Another type of guide is implemented in FIG. 8 with reference to the drive unit 50 illustrated there. Here, the outer wheel 11 is supported between the two magnetic wheel disks 12a and 12b, the magnet 17 simultaneously adopting here the function of the rolling disk 13. The magnet 17 is, however, subject to the limitations in the dimensions valid for the disk, and this can lead to a limitation of the magnetic forces.

Both with the drive unit 40 of FIG. 3, and with the drive unit 50 of FIG. 8, the magnetic wheel disks 12a, 12b, the disk 13 and the axial guide 19 are arranged coaxially with the common axis 20. The unit can be driven via a likewise coaxial drive shaft 18 that is connected securely against rotation to the magnetic wheels and is connected to a motor drive that is not shown.

Figure 4:
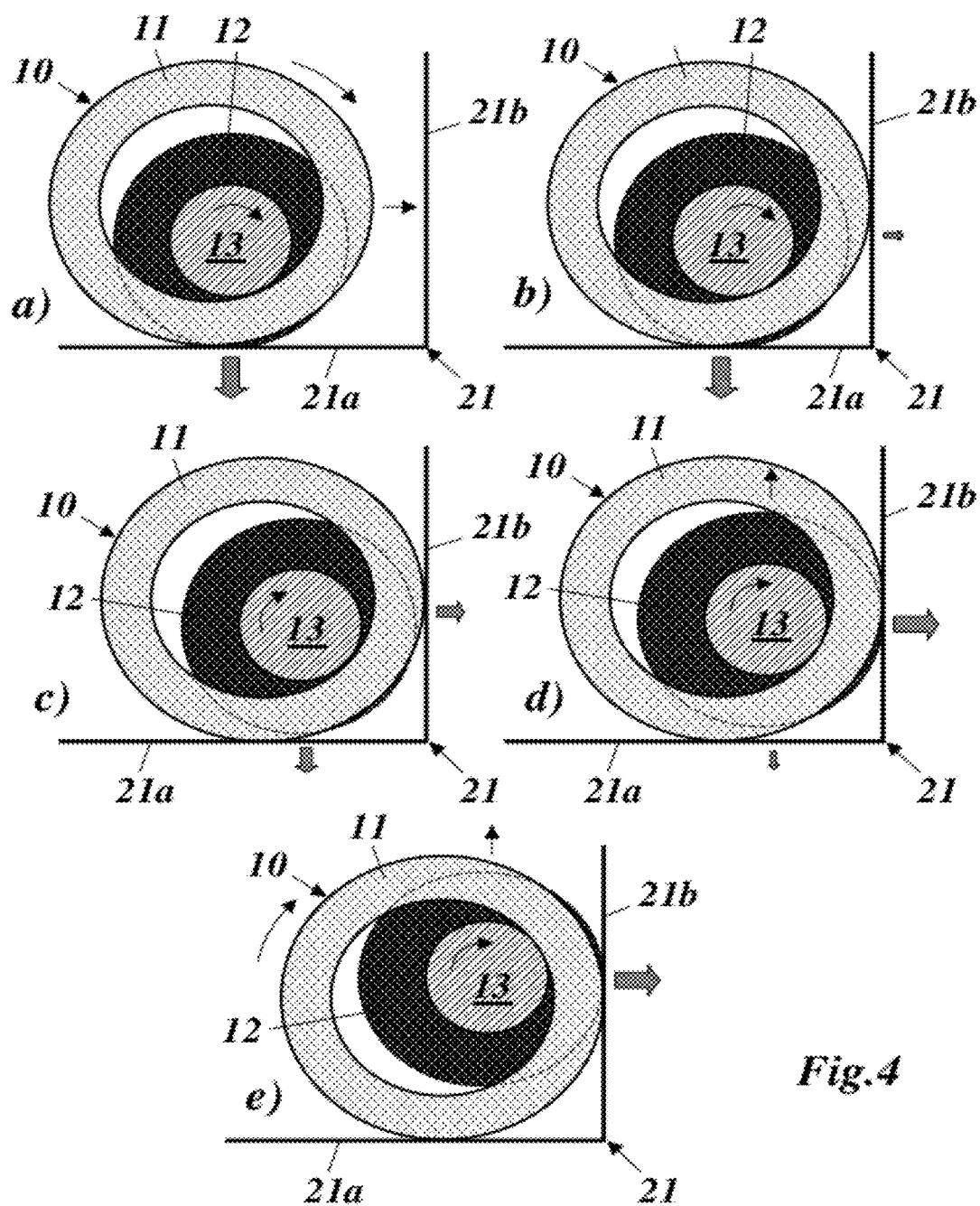
FIGS. 4(a) to 4(e) show various phases in the negotiation of a concave corner by a drive unit according to FIG. 2.

The course of the movement of the drive unit 10 in passing a concave corner is illustrated in FIG. 4. The concave corner 21 is formed by a horizontal floor 21a and a vertical wall 21b. The drive unit 10 rolls off on the floor 21a toward the concave corner 21, the magnetic wheel 12 rolling along on the wall. The strong magnetic adhesive force between the magnetic wheel 12 and floor/wall 21a/21b is symbolized by a broad arrow.

As soon as the drive unit 10 hits the vertical wall 21b with the outer wheel 11 (FIG. 4b), the disk 13 is forced to rise upward by rolling further along the inner peripheral surface of the outer wheel 11 (FIG. 4c). The magnetic wheel 12 thereby approaches the vertical wall 21b yet further, the result being an increase in the magnetic adhesion to this wall (arrow). If the disk 13 rises yet further, it increasingly becomes detached from the horizontal floor 21a, as a result of which the magnetic adhesion there becomes ever weaker until it disappears completely (FIG. 4e). The drive unit 10 has thus negotiated the concave corner 21 and simultaneously turned round the direction of movement by 90°. It can now proceed without hindrance on the vertical wall 21b.

Figure 5:
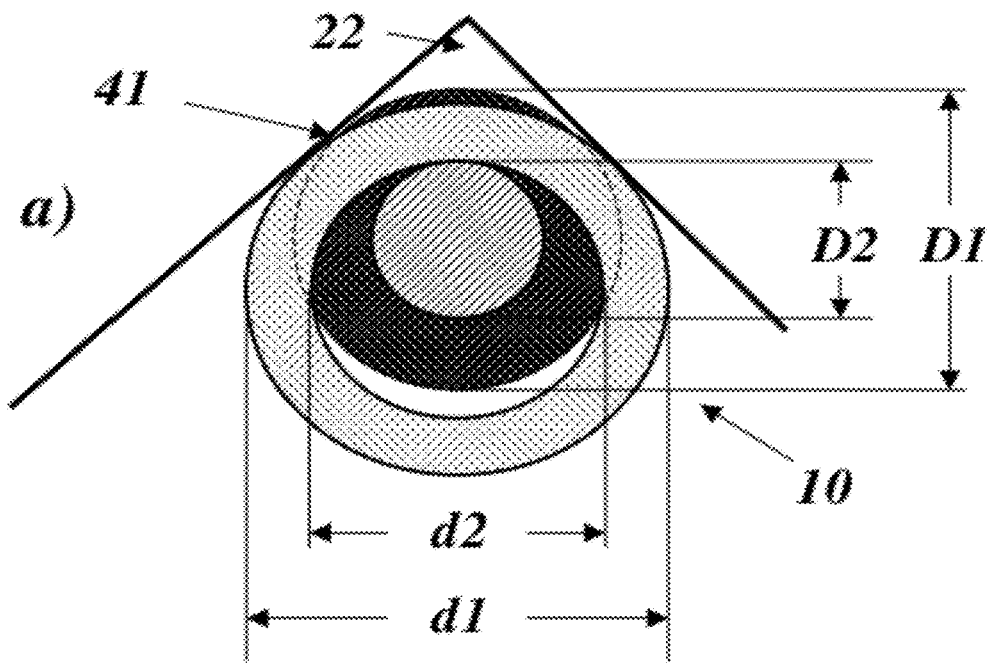
FIG. 5 shows for the mode of operation of the drive unit according to FIG. 4(a) the four most important dimensions (FIG. 5(a)), and, in FIGS. 5(b) and 5(c), the limits of the effectiveness and the disturbance of the adhesion.
Figure 5:
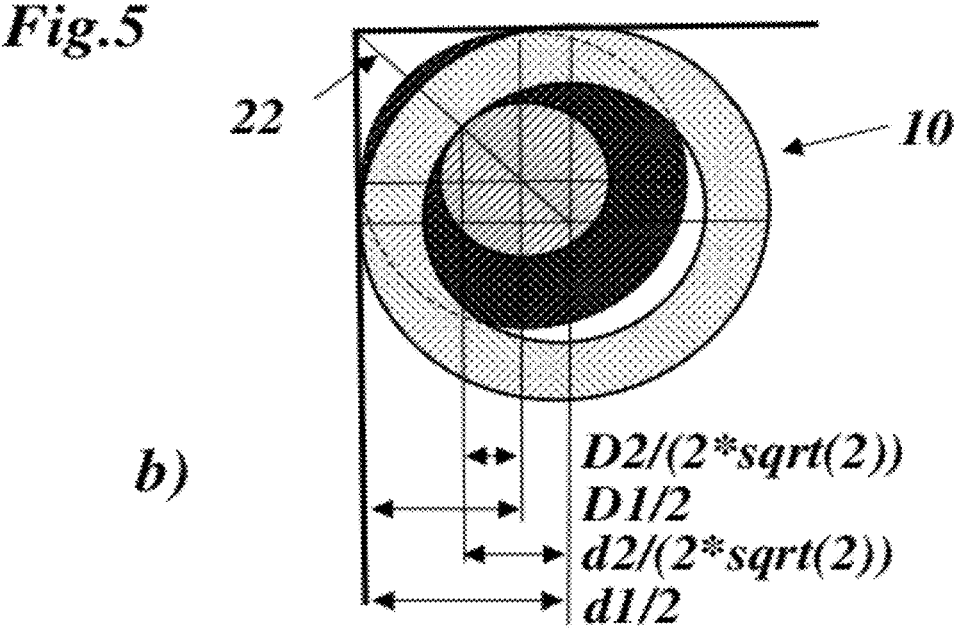
Figure 5:
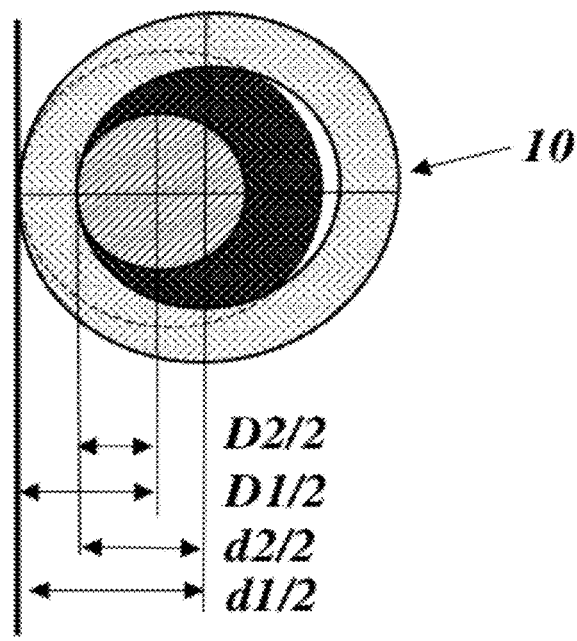

A special situation arises when passing a concave corner (22 in FIG. 5) that is situated "overhead". There are various possibilities for driving through such a corner 22 safely. One possibility, which is indicated in FIG. 5, consists in selecting the outside diameter d1 of the outer wheel 11 such that the magnetic forces between the magnetic wheel 12 and the corner 22 are large enough in each phase of the movement to hold the vehicle connected to the drive unit 10 against the force of gravity. To this end, the gap 41 between the magnetic wheel 12 and wall, said gap being illustrated in FIG. 5(a), should be small enough to ensure magnetic force still sufficient in a manner that is—although it should also not disappear entirely—since otherwise the effectiveness of the mechanism would no longer be ensured. The limiting case for this disappearance of the effectiveness is illustrated in FIG. 5(b), where the outer wheel 11 no longer has any effect. This limit of the effectiveness is achieved for concave corners of 90° by the following geometric condition: $(d1-d2)/\sqrt{2} > (D1-D2)/\sqrt{2}$.

Figure 6:
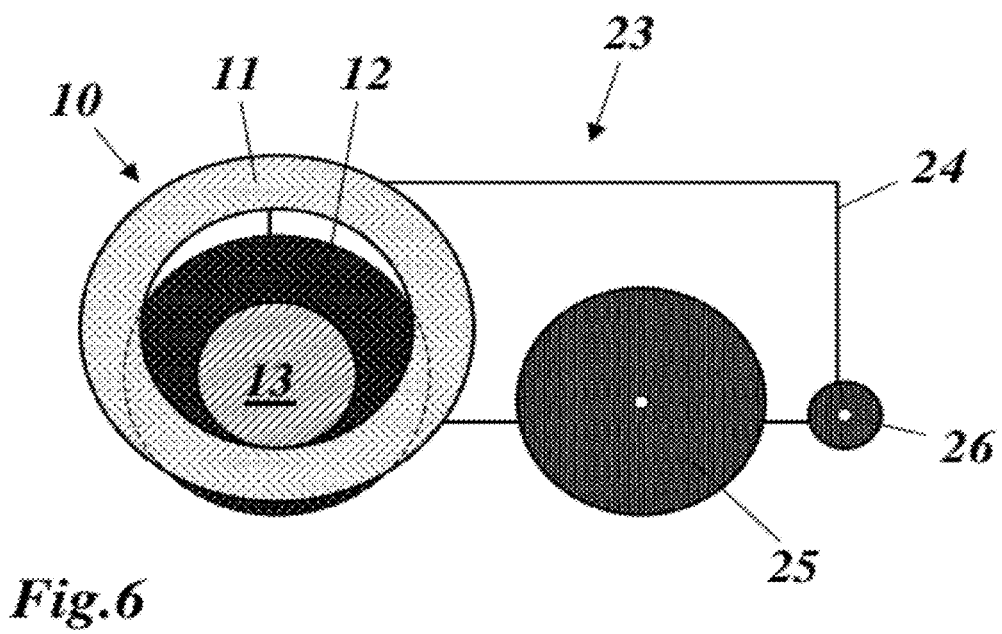
FIG. 6 shows a side view of a vehicle, equipped with drive units according to FIG. 2, according to an exemplary embodiment of the invention.
Figure 7A:
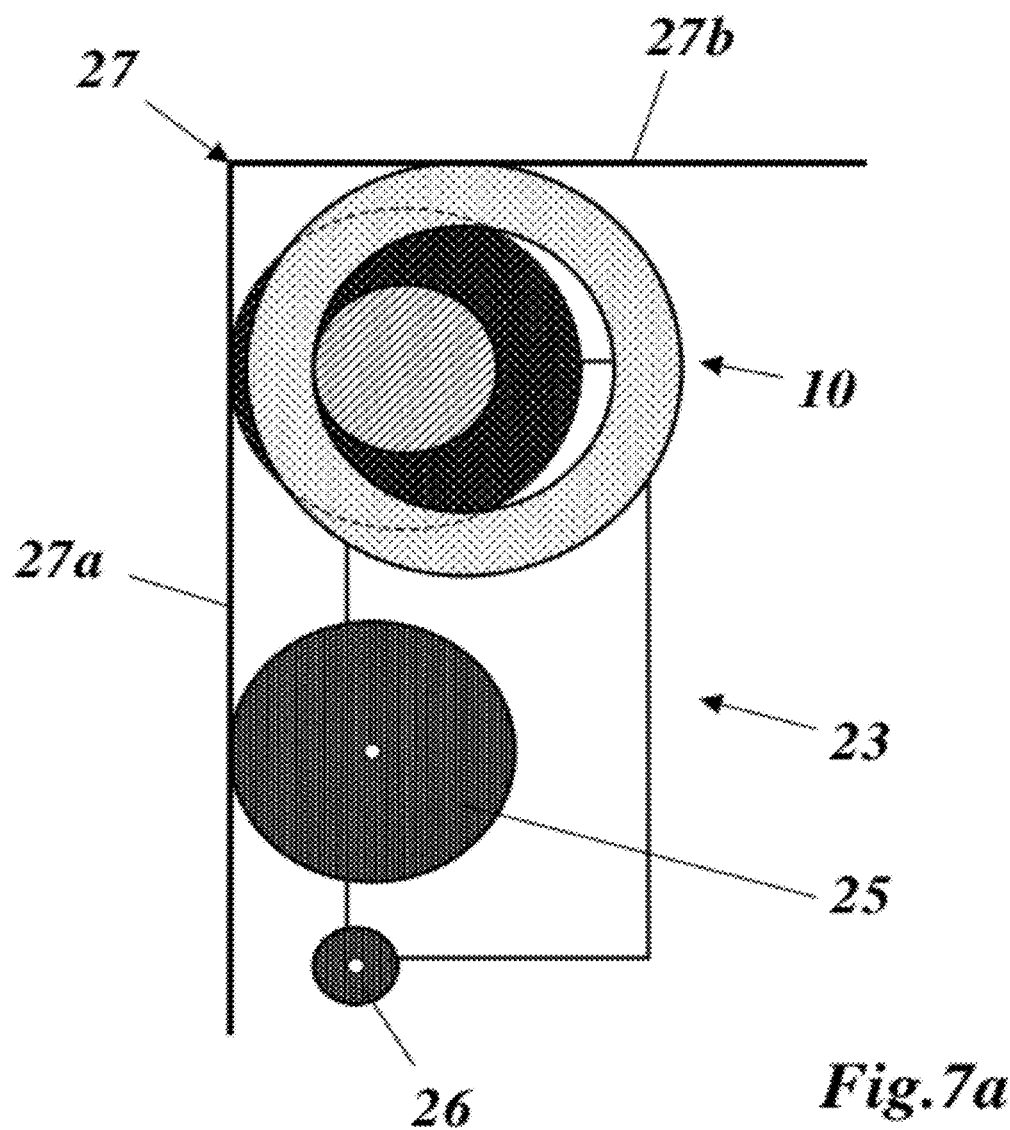
FIGS. 7a to 7c show a number of phases in the negotiation of an overhead concave corner by a vehicle according to FIG. 6.
Figure 7B:
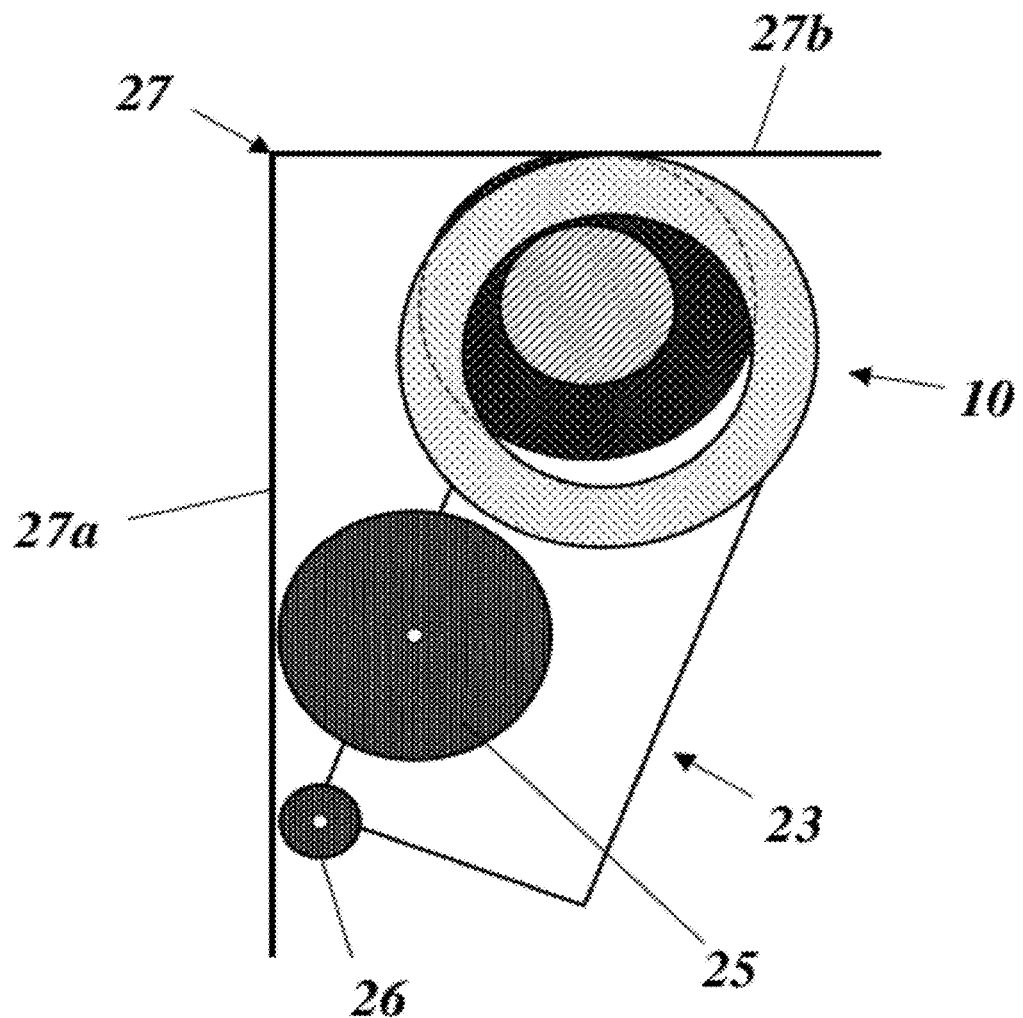
Figure 7C:
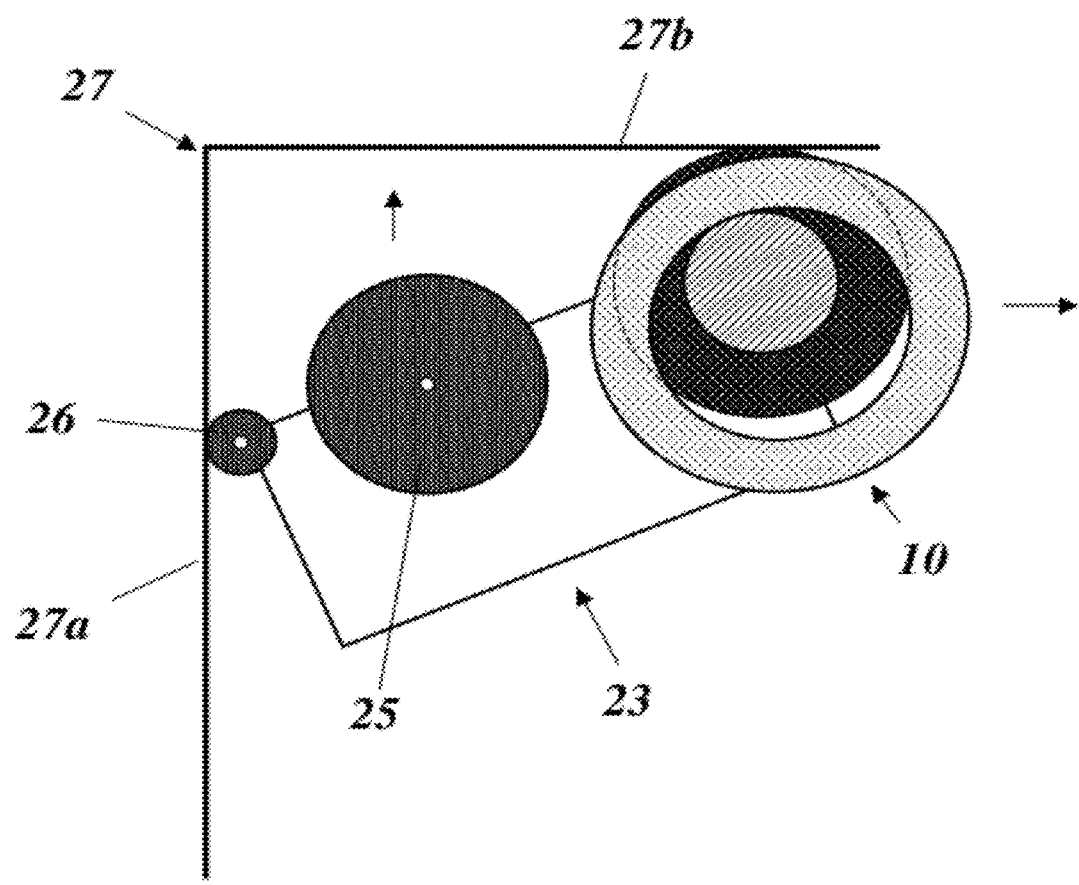

Another possibility is illustrated and explained in FIGS. 6 and 7. The vehicle 23 shown in FIG. 6, which has a pair of drive units 10 at the front (left in FIG. 6) on a vehicle body 24, is additionally equipped with simple, motor driven rear wheels 25. Moreover, small auxiliary wheels 26 are also provided at the rear lower corner of the vehicle body 24. FIG. 7 shows different phases in the passage of a corner 27, lying above, by the vehicle 23 from FIG. 6. In FIG. 7a, the vehicle 23 moves upward in a vertical direction on the wall 27a toward the corner 27. When the drive units 10 have passed the corner 27, the vehicle 23 hangs obliquely on the rear wheels 25 and the drive units 10 (FIG. 7b). When the magnetic adhesion on the drive units 10 is lost in this situation, the auxiliary wheels 26 are placed on the wall 27a, and the vehicle 23 can be driven upward by driving the rear wheels 25 until the adhesion at the drive units 10 is sufficient once again. Driving through the corner 27 can then be continued by moving the drive units 10 further on the wall 27b (FIG. 7c).

Figure 9:
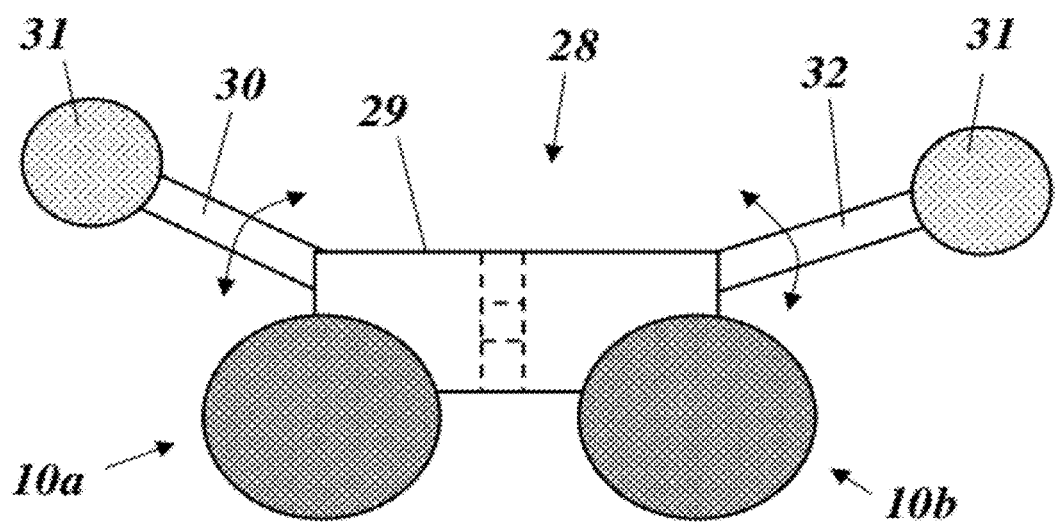
FIG. 9 shows a side view of another exemplary embodiment of a vehicle according to the invention having two pairs of inventive drive units with additional pivoting arms that can be used for support purposes in negotiating convex edges.
Figure 11:
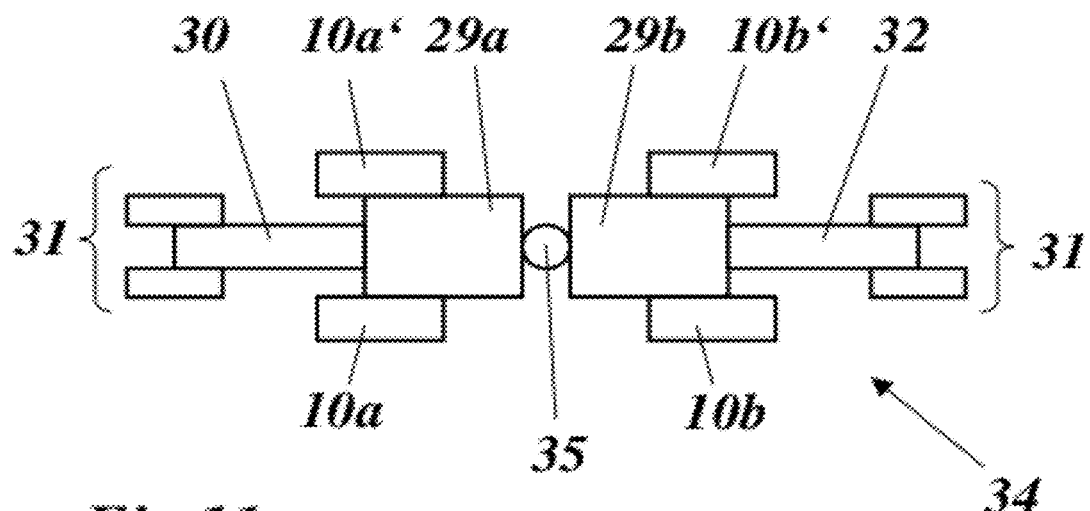
FIG. 11 shows a plan view from above of a vehicle according to FIG. 9, in which the vehicle body is subdivided into two subunits interconnected in an articulated fashion.

The inventive drive units 10 can advantageously be used in a vehicle as illustrated by example in FIG. 9 and FIG. 11. The vehicle 28 from FIG. 9 has a vehicle body 29 on which there are respectively arranged at the front and at the rear in the travel direction a pair of drive units 10 (10a, 10a', 10b, 10b' in FIG. 11). On the vehicle body 29 additionally oriented at the front and rear in the travel direction are pivoting arms 30 and 32 which can be pivoted by means of a pivoting drive about a pivoting axis lying transverse to the travel direction (double arrow in FIG. 9). Arranged on the free ends of the pivoting arms 30, 32 are contact elements 31 that provide the mechanical contact between the pivoting arms and a wall or the like. The contact elements 31 can be rollers, or balls or bodies shaped otherwise in a rounded fashion. As indicated by dashes in FIG. 9, the vehicle can also consist of subunits that are interconnected in an articulated fashion (see FIG. 11).

Figure 10A:
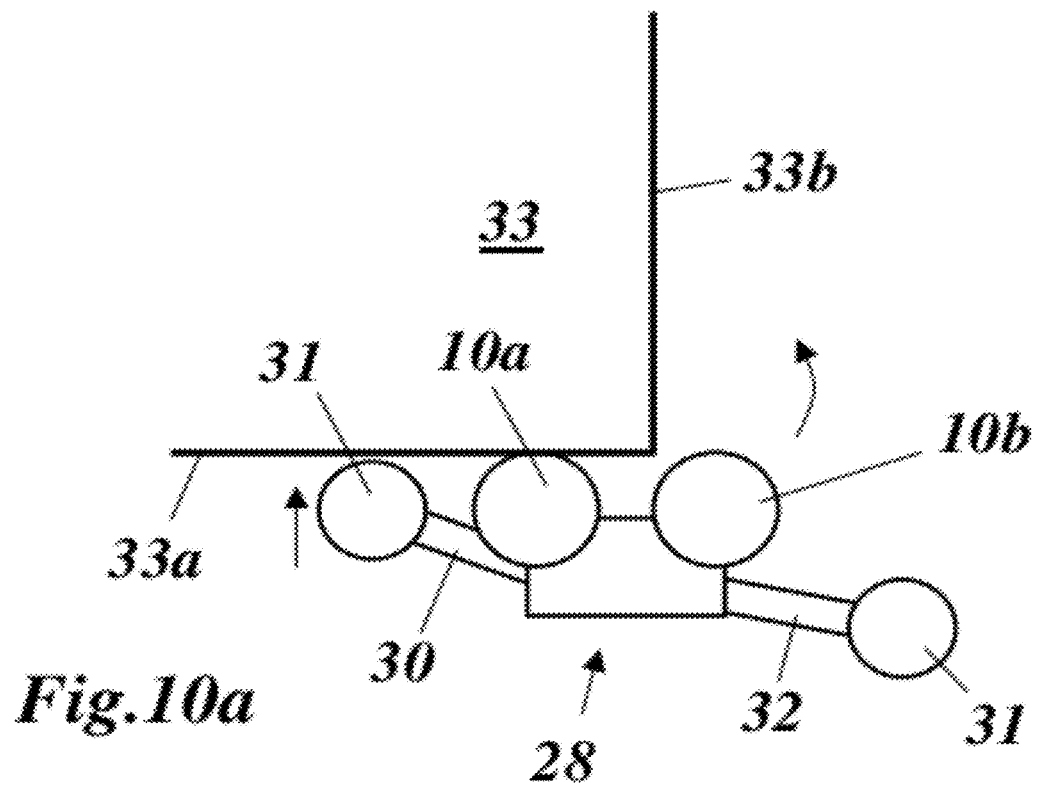
FIGS. 10a to 10c show a number of phases in the negotiation of an overhead convex edge by a vehicle according to FIG. 9.
Figure 10B:
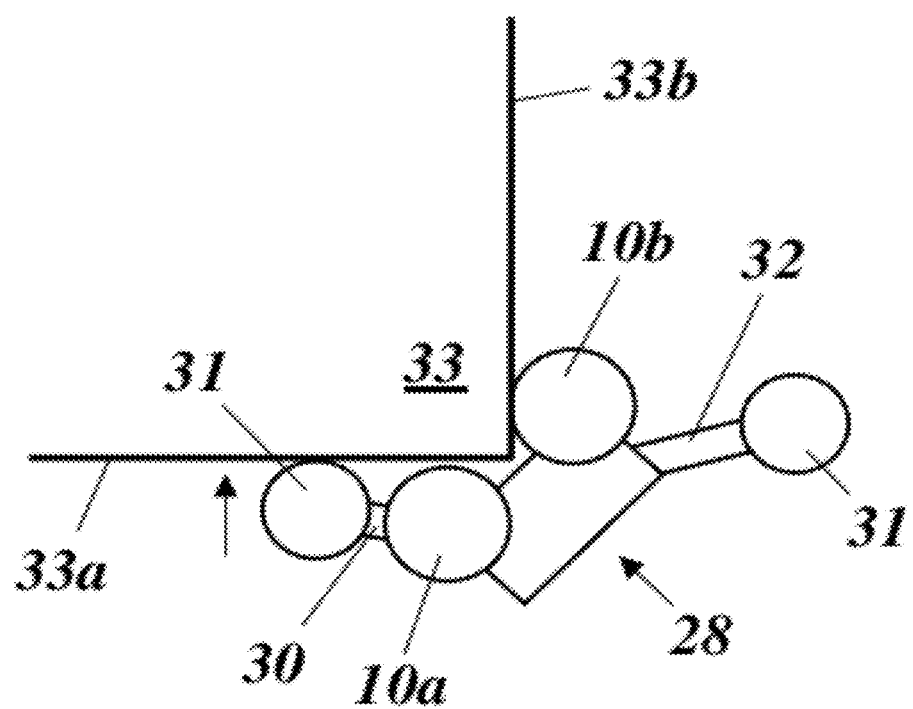
Figure 10C:
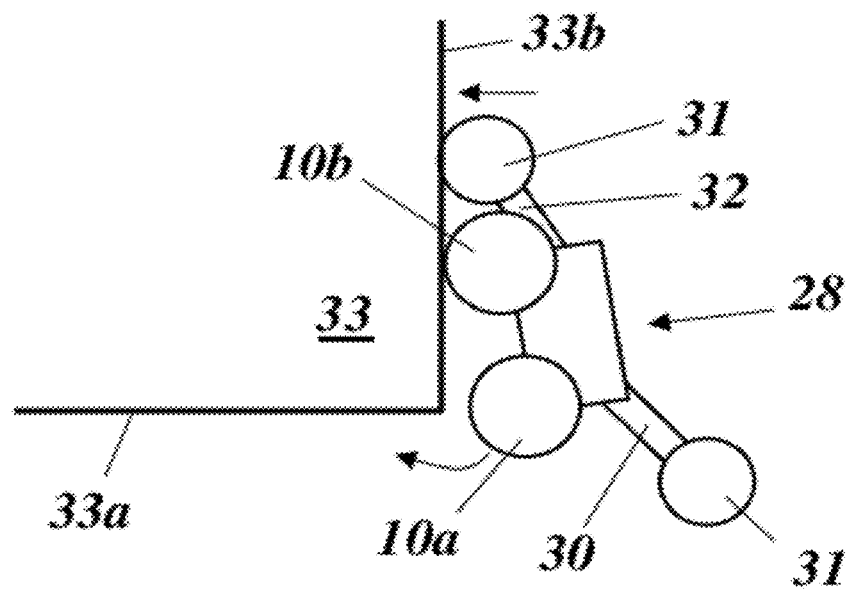

The additional pivoting arms 30, 32 are used for the purpose of supporting the vehicle 28 as it drives around a convex edge (33 in FIG. 10) on the walls 33a and 33b of the edge 33 in specific situations, as they are illustrated in FIGS. 10a, 10b and 10c. In FIGS. 10a and 10b, the rear pivoting arm 30 is pressed against the wall 33a, in order to pivot the vehicle 28 with the front side about the edge 33. The front pivoting arm 32 is used in FIG. 10c, in order to bring the rear drive units 10a, 10a' onto the wall 33b again.

When, in the case of the vehicle 34 illustrated in FIG. 11, the pairs of the drive units 10a, 10a', 10b, 10b' are driven independently of one another, and each pair forms a subunit 29a, 29b that is connected to the other subunit via a free pivoting connection 35, the vehicle 34 can be controlled via the different rotational speeds of the individual drive units. If the pairs are driven synchronously or are replaced by continuous rollers, the control can also be effected by a motor-driven, controllable pivoting connection 35.

LIST OF DESIGNATIONS 10,40,50 Drive unit
10a,10a',10b,10b' Drive unit
11 Outer wheel
12 Magnetic wheel
12a, 12b Magnetic wheel disk
13 Disk
14 Peripheral surface (disk)
15 Peripheral surface (magnetic wheel)
16 Inner peripheral surface (outer wheel)
17 Magnet
18 Drive shaft
19 Axial guide
20 Axis
21,22,27 Corner (concave)
21a Floor
21b Wall
23,28,34 Vehicle
24,29 Vehicle body
25 Rear wheel
26 Auxiliary wheel
27a,27b Wall
29a,29b Subunit
30,32 Pivoting arm
31 Contact element
33 Edge (convex)
33a Floor
33b Wall
35 Pivoting connection
36 Drive unit
37 Outer wheel
38 Magnetic wheel
39 Step
41 Gap
D1,D2 Diameter
d1,d2 Diameter

What is claimed is:

1. A drive unit for a vehicle used as a robot in pipe systems or cavities, the drive unit comprises at least one ring-like outer wheel and at least one driven magnetic wheel, the at least one outer wheel and the at least one magnetic wheel have axes parallel to each other and are arranged eccentrically in relation to one another, and engaging with one another, in such a way that, when rotating relative to the at least one outer wheel the at least one magnetic wheel delineate with its wheel axis a concentric circle lying within the outer wheel, the outer wheel and the magnetic wheel are arranged one behind another in an axial direction, and the engagement between the outer wheel and the magnetic wheel is effected by a circular, concentric disk that is connected securely against rotation to the magnetic wheel and rolls with its outer peripheral surface on the inner peripheral surface of the outer wheel.

2. The drive unit as claimed in claim 1, wherein the engagement between the disk and the outer wheel is effected by positive locking.

3. The drive unit as claimed in claim 2, wherein the positive locking is effected by toothing.

4. The drive unit as claimed in claim 1, wherein the engagement between the disk and the outer wheel is effected by friction locking.

5. The drive unit as claimed in claim 1, wherein the outside diameter (d1) of the outer wheel is greater than the outside diameter (D1) of the magnetic wheel.

6. The drive unit as claimed in claim 5, wherein the difference between the outside diameter (d1) and the inside diameter (d2) of the outer wheel is less than or equal to the difference between the outside diameter (D1) of the magnetic wheel and the outside diameter (D2) of the disk.

7. The drive unit as claimed in claim 6, wherein $(d1-d2)/\sqrt{2} > (D1-D2)/\sqrt{2}$.

8. The drive unit as claimed in claim 1, wherein two parallel, equally sized driven magnetic wheels are provided that are spaced apart from one another in an axial direction and are connected in a rotationally secured fashion to the disk, and arranged between the two magnetic wheels is a magnet that together with the two magnetic wheels forms a part of a magnetic circuit.

9. The drive unit as claimed in claim 8, wherein the disk is arranged outside the two magnetic wheels.

10. The drive unit as claimed in claim 9, wherein an axial guide is provided for the outer wheel surrounding the disk.

11. The drive unit as claimed in claim 8, wherein the magnet acts simultaneously as the disk, and the outer wheel is supported between the two magnetic wheels.

12. A vehicle for use as a robot in pipe systems or cavities, the vehicle comprises a vehicle body on which at least one drive unit is arranged for locomotion, the drive unit, comprises at least one ring-like outer wheel and at least one driven magnetic wheel, the at least one outer wheel and the at least one magnetic wheel have axes parallel to each other and are arranged eccentrically in relation to one another, and engaging with one another, in such a way that, when rotating relative to the at least one outer wheel the at least one magnetic wheel delineates with its wheel axis a concentric circle lying within the outer wheel, the outer wheel and the magnetic wheel are arranged one behind an other in an axial direction, and the engagement between the outer wheel and the magnetic wheel is effected by a circular, concentric disk that is connected securely against rotation to the magnetic wheel and rolls with its outer peripheral surface on the inner peripheral surface of the outer wheel.

13. The vehicle as claimed in claim 12, wherein a plurality of drive units are arranged in pairs on opposite sides of the vehicle body.

14. The vehicle as claimed in claim 13, wherein in each case a pair of drive units are provided on the vehicle body, relative to a travel direction, at a front portion and a rear portion.

15. The vehicle as claimed in claim 13, wherein all the drive units are driven independently of one another.

16. The vehicle as claimed in claim 14, wherein the vehicle body is subdivided in a travel direction into two subunits interconnected in an articulated fashion, and each subunit is assigned a pair of drive units.

17. The vehicle as claimed in claim 16, further comprising pivoting arms that project forward and rearward in the travel direction, are pivotable by a drive and is configured to support the vehicle on a wall as it drives around a corner.

18. The vehicle as claimed in claim 12, wherein rear wheels and/or auxiliary wheels are provided on the vehicle body in addition to drive units arranged at a front portion in a travel direction.

* * * * *